MEMORY SYSTEM

Original Filed Nov. 10, 1964 2 Sheets-Sheet 1

INVENTOR
W. ULRICH
BY
ATTORNEY

FIG. 2

| READ COMMAND | WRITE COMMAND | KEY DATA WRITE CONTROL SIGNAL | KEY DATA BIT SIGNAL | GATE 13 | DETECTOR 19 | GATE 21 | GATE 16 | GATE 15 | GATE 23 | GATE 41 |
|---|---|---|---|---|---|---|---|---|---|---|
| 1 | 0 | 0 | 0 | ✓ | ✓ / X | ✓ / X | X | ✓ | X | ✓ / X |
| 0 | 1 | 0 | 0 | X | ✓ / X | ✓ / X | X / ✓ | ✓ / X | X / ✓ | ✓ / X |
| 0 | 1 | 0 | 1 | X | ✓ / X | ✓ / X | X / ✓ | ✓ / X | X / ✓ | ✓ / ✓ |
| 0 | 1 | 1 | 0 | X | ✓ / X | X | ✓ | X | ✓ | X |
| 0 | 1 | 1 | 1 | X | ✓ / X | X | ✓ | X | ✓ | ✓ |

United States Patent Office

Re. 27,239
Reissued Nov. 23, 1971

27,239
MEMORY SYSTEM

Werner Ulrich, Glen Ellyn, Ill., assignor to Bell Telephone Laboratories, Incorporated, New York, N.Y.

Original No. 3,365,704, dated Jan. 23, 1968, Ser. No. 410,084, Nov. 10, 1964. Application for reissue Nov. 14, 1968, Ser. No. 793,203
Int. Cl. G06f *9/00*
U.S. Cl. 340—172.5 16 Claims

Matter enclosed in heavy brackets [ ] appears in the original patent but forms no part of this reissue specification; matter printed in italics indicates the additions made by reissue.

ABSTRACT OF THE DISCLOSURE

I disclose apparatus for protecting the storage of information in the memory registers of a data processor. Each register is provided with an extra ("key data") bit which may be set to indicate that the information contained in the register has a degree of importance such that it is not to be casually over-written by a ordinary order to write new information. Circuitry is provided which is capable of responding to a special control signal for overriding the appearance of a set key data bit. In this way it is possible to alter the information content of the register by program command when it is in fact desired to do so.

Figure 1:
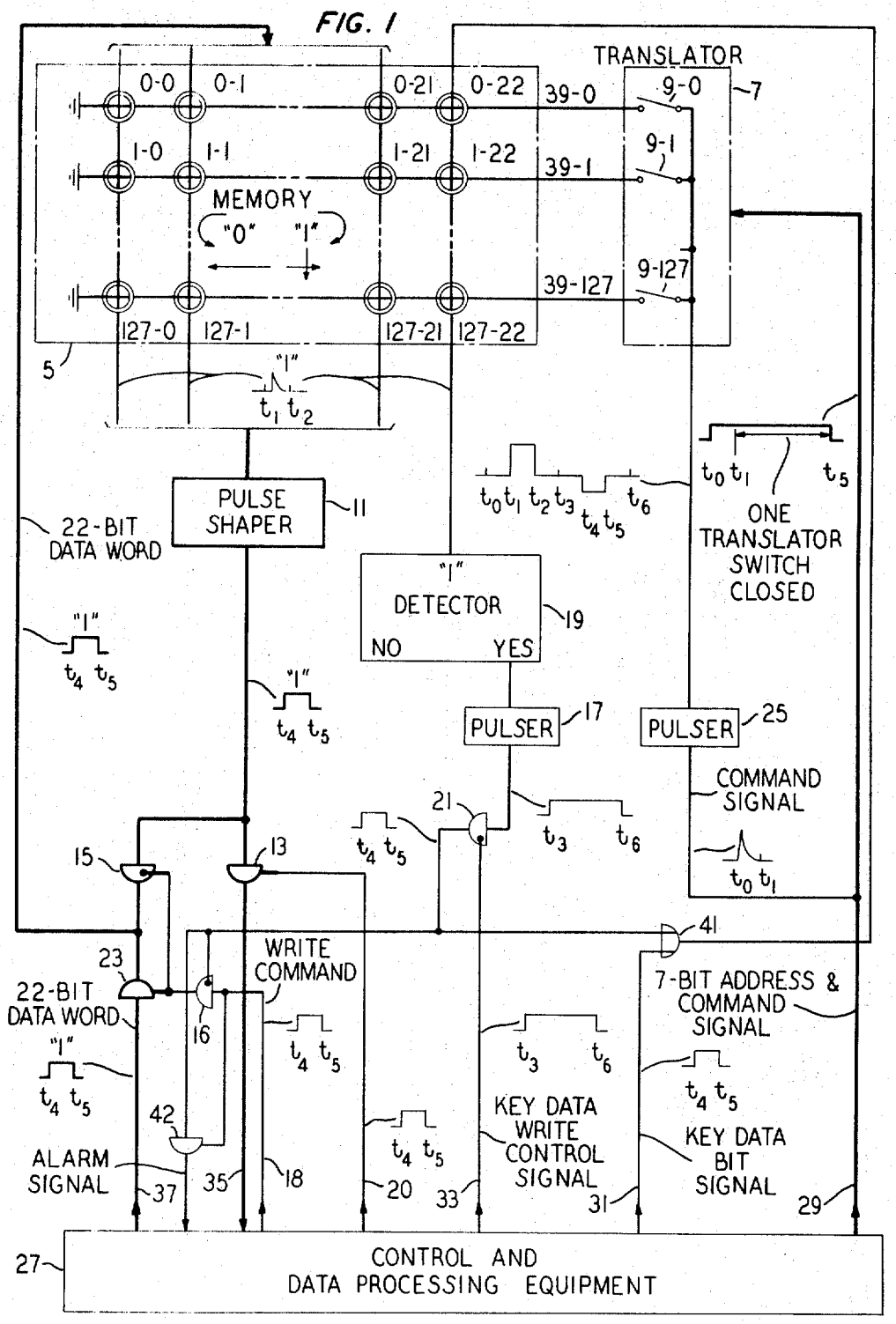

This invention relates to data processing systems and more particularly to memory equipment for use therein.

In order to write a new word in the memory of a data processor it is necessary to transmit to the writing circuitry the address which specifies the memory location in which the new word is to be written. If an error is made in deriving the address or the address is mutilated during its transmission to the memory from the control circuitry, the word will be written in an incorrect location and will thus overwrite another word. At times the subsequent machine operation resulting from the erroneous writing does not thereafter render the system inoperative. For example, in processing a telephone call, if a called number is falsely over-written, it may result in a wrong call being established but subsequent machine operation is not impaired.

At other times, however, an erroneous writing may have dire consequences. Certain data words stored in a memory may be "key" data words. Such words are those which if erased from the memory will cause subsequent impairment of machine operation. For example, in a telephone data processing system if the data word erroneously overwritten represents inoperative switching paths, many subsequent calls may not be completed if the machine attempts to utilize the inoperative switches. While a key data word is often read out of the memory during a particular subroutine, the key data word is thereafter rewritten in the memory in the same or a subsequent subroutine, e.g., after the up-dating of the key data word. But if the key data word is erroneously over-written subsequent machine operation may very well be highly irregular.

Thus with changeable memories it is especially important to insure that false data are not erroneously written in the memory at locations containing key data words.

*As is known, the address together with the command signal specifying the operation to be performed by the memory, such as the write command, together with other control signals that may be present are often referred to as an instruction for determining the manner in which the memory is acted upon. The special control signal determines whether the instruction is privileged or not, e.g., is privileged to allow the new data word to be written in the memory even if the key data bit read out of the*

*specified location is a 1 indicating a normally protected data word.*

Various techniques have been used in the prior art to prevent the erroneous over-writing of key data words. The most obvious solution is to provide highly reliable, and therefore expensive, equipment. Further it is possible to reserve a block of memory (protected area) for key data words. The key data words can be changed only through a special memory writing order. This arrangement is costly since memory capacity must be reserved for the maximum anticipated number of key data words. Additionally this technique may introduce programming difficulties. Another technique which may be used to store each key data word in the memory at two locations. This redundancy insures that even if a key data word is falsely overwritten, it nevertheless remain in the memory at another location for subsequent use. Needless to say the cost of the memory system increases significantly. Still another technique is to provide parity check bits in the address transmitted to the memory. While this latter technique enables the system to detect certain errors in the address transmission, other errors may go undetected. For example, in a single bit parity system a double error is not detected and a key data word may still erroneously be over-written in the memory.

It is a general object of this invention to provide a reliable memory system in which key data words are not erroneously erased.

In the illustrative embodiment of the invention, the data words stored in the memory are 22 bits in length. Each data word locations in the memory however contains 23 bits. The 23rd bit is a key data bit. It is a 1 if the respective data word is a key data word; it is a 0 if the data word is not.

When the operation performed is a read, the address transmitted to the memory controls the read-out and the transmission to the data processing equipment of the data word in the respective memory location. The data word is then rewritten back in the memory at the same location for future use.

When the operation is a write, the address transmitted to the memory controls the read-out of the 23 bits in the respective memory location. The 23rd bit, the key data bit, is immediately examined. If it is a 0, indicating that the 22-bit data word is ordinary data, the new data word is then written in the memory at the same location. However, if the key data bit is a 1, ordinarily the new 22-bit data word is not written in the memory. Instead, the data word just read out is immediately rewritten in the memory at the same location. The new data word is prevented from being written in the memory at this time for were it to be written in the memory the key data word priorly read out would be erased erroneously.

If it is desired to over-write a key data word, a special key data write control signal is sent to the memory system. This signal allows the new data word to be written in the memory even if the key data bit read out of the specified location is a 1. Thus the memory system erases a key data word only if the special control signal is received. This technique insures that a key data word will not be erased erroneously from the memory when all that is to be written over it is an ordinary data word.

It is a feature of this invention to provide a key data bit associated with each data word stored in the memory of a data processor, the key data bit indicating whether the respective word is key data or ordinary data.

It is another feature of this invention to examine the key data bit associated with any memory data word read out of the memory when the word is to be over-written by a new data word and to allow the over-writing if the respective key data bit is a first one of the binary values.

It is another feature of this invention to rewrite the ata word read out back in the memory at the same loca- on if the respective key data bit is the second binary alue and a special key data write control signal is not ansmitted to the memory.

It is still another feature of this invention to control ıe over-writing of a key data word even when the re- pective key data bit read out is the second binary value the key data write control signal is transmitted to the ıemory.

Further objects, features, and advantages of the inven- on will become apparent upon consideration of the fol- owing detailed description in conjunction with the draw- ıg, in which:

FIG. 1 is a schematic representation of a data processor lustrative of one embodiment of my invention, and FIG. 2 depicts the operations of various ones of the lements in FIG. 1 for various signals transmitted within ıe data processor.

In FIG. 1 various elements of data processors well nown in the art but not necessary for an understanding f my invention, such as circuitry for deriving address gnals, have been omitted. Further, as various ones of ıe functional blocks depicted perform known and recog- ized operations, the details of such circuitry have not een shown. A specific data processor in which my in- ention may advantageously be employed is Doblmaier al. application Ser. No. 334,875, filed Dec. 31, 1963, nd such disclosure is hereby incorporated herein.

In the drawing there are two basic units shown, a ıemory 5, and control and data processing equipment 7. The other elements, e.g., translator 7 and pulser 25, re not shown as part of either the memory or the control quipment. This has been done merely for the purpose of xplanation and the various elements providing the fea- ıres of the invention may be incorporated in the memory r control equipment in any actual data processing sys- m.

Certain parts of the drawing are shown in heavy lines. Vhile the system does include individual conductors, ıbles are shown by heavy lines. The number of con- uctors in each cable depends upon the number of bits nd signals transmitted through it. Each cable is labeled indicate the information it carries. Inasmuch as a cable ırries more than one pulse a typical pulse transmitted ver the cable is also shown by heavy lines in the draw- ıg. Similarly, various elements through which some of ıe cables pass are also shown in heavy lines to indicate ıat the single element is merely representative of a group. or example, gate 23 represents 22 gates, each associated ith one of the 22 conductors in, or 22 bits transmitted ırough, cable 37. Throughout this description while a ate may be referred to in the singular, it must be borne mind that if the gate is associated with a cable the ate represents a group of gates rather than a single one f them.

Memory 5 contains 128 rows of binary cores, 23 cores eing included in each row. Each core is designated by a rst number indicating the respective row and a second umber indicating the respective column. As depicted in ıe drawing a core represents a 0 when its flux is in the ounterclockwise direction. A core is set in the 0 state hen a current of one unit magnitude flows to the left ırough the respective row conductor( shown by the dot- d arrow in memory 5). A core represents a 1 when its ux is in the clockwise direction. A 1 is written into a articular core when a current of one-half unit magnitude ows to the right in the respective row conductor and a milar current flows downward in the respective column onductor.

Memory 5 is a destructive read-out store. When current ows to the left through one of the row conductors all of ıe cores in the row are set in the 0 state. If any one of ıe cores was previously in the 1 state, in switching to the state a positive pulse is induced in the respective column onductor. When the data in a row of cores is read out of the memory, resulting in positive pulses on some of the column conductors and no pulses on the others, the word is erased from the memory because all of the cores in the row remain in the 0 state.

The operation of the system may be best understood by considering the various sequences which may occur. These are the following:

(1) Ordinary or key data word read out of memory.
(2) Ordinary data word over-written.
(3) Key data word erroneously over-written.
(4) Key data word correctly over-written.

Ordinary or key data word read out of memory

When a word is to be read from the memory a seven-bit address is applied by control and data processing equipment 27 to cable 29. At the same time a command signal is applied to this cable. The command signal is merely a pulse, applied at time $t_0$, and is extended to pulers 25. The output of the pulser comprises a positive pulse of one unit magnitude, applied between times $t_1$ and $t_2$, and a negative pulse of one-half unit magnitude applied between $t_4$ and $t_5$. These two pulses are extended through translator 7 and one of the 128 switches in the translator. Switches 9–0 through 9–127 are merely symbolic. The translator may actually comprise logic elements which control the application of the two pulses from pulser 25 to one of the row conductors 39–0 through 39—127.

The seven-bit address is extended directly to translator 7. Cable 29 includes seven conductors for this purpose. A 0 is represented by the absence of a pulse. A 1 is represented by a positive pulse between times $t_0$ and $t_5$. One of the switches 9–0 through 9–127 closes between times $t_1$ and $t_5$ as shown in the drawing in order that the positive and negative pulses from pulser 25 be applied to one of the row conductors.

When the positive pulse is applied to the selected row conductor, all of the cores in the row are set in the 0 state. Positive pulses appear on only those column conductors which pass through cores previously in the 1 state. The positive read-out pulse on any column conductor appears between times $t_1$ and $t_2$. The rightmost core in any row represents the key data bit associated with the data word contained in the first 22 cores in the row. Detector 19, which operates during both read and write operations, determines whether the key data bit associated with the data word being read is a 1 or a 0. If the key data bit is a 0, and an ordinary data word is being read, no pulse appears in the rightmost column conductor when the row of cores is set in the 0 state. Detector 19 does not operate nor does pulser 17. If the word being read out is key data the key data bit is a 1 and both detector 19 and pulser 17 operate. A key data write control signal is never applied to the control terminal of normally enabled gate 21 during a read operation and consequently the output pulse from pulser 17 passes through this gate to the control terminal of normally enable gate 16 and one of the inputs of OR gate 41. Thus gate 16 remains enabled if the word read out is ordinary data, and is inhibited from operating if the word read out is key data. But even in the former case gate 16 does not operate. The input signal to this gate, a write command, is never applied to conductor 18 during a read operation. Consequently, whether the word read out of the memory is key data or ordinary data, gate 16 does not operate.

During the read operation a read command signal is applied to the control terminal of gate 13 between times $t_4$ and $t_5$. Pulse shaper 11 reshapes the pulses on the 22 column conductors passing through cores in the row which previously contained 1's. Positive pulses are applied at the output of the pulse shaper between times $t_4$ and $t_5$. These pulses pass through gate 13 and cable 35 to the control and data processing equipment. The desired word is thus read out of the memory.

*As is known, information specifying an address and that an operation is to be performed involving that ad-*

*dress is termed an instruction. In the operation being described, the reading of an ordinary word from the memory, the address and command signals applied determine the address and that the read operation is to be performed at that address in response to the applied instruction.*

The control and data processing equipment applies no signals to cable 37 during a read operation. Gate 23 would not operate even were signals to appear on cable 37 because gate 16 is not operated to enable gate 23. Since gate 16 is never operated during a read operation, normally enabled gate 15 remains operative. This gate is used to control the rewriting of the data word read out of the memory back in it. A positive pulse of one-half unit magnitude appears on each column conductor passing through a core which is to be set back in the 1 state. Between times $t_4$ and $t_5$ pulser 25 applies a current pulse flowing in the left direction through the selected row conductor. During this time interval the data word read out is written back in memory 5.

The value of the key data bit itself which is stored in memory 5 at this time is determined by the operation of gate 21. The output of this gate is energized and operates OR gate 41 only if the key data bit read out of the memory was a 1. A positive pulse of one-half unit magnitude at the output of gate 41 appears on the column conductor in the memory which passes through all of the key data bit cores. The key data bit core whose bit value was previously read is now in the 0 state. If it originally contained a 1, a 1 is now rewritten in it. If it originally contained a 0 gate 41 does not operate and the 0 in the key data bit core remains there. A time $t_5$ the operated switch in translator 7 is opened and the sequence of operations is completed.

Ordinary data word over-written

When the address transmitted to translator 7 identifies a row which contains a data word having a key data bit of value 0 detector 19 does not operate. Pulser 17 does not apply a positive output pulse to the input of gate 21. Gate 21 thus does not operate even though it remains enabled during this write operation since a key data write control signal does not appear on conductor 33 when an ordinary data word is being over-written. Since the output of gate 21 is low, gate 16 remains enabled. During any write operation a write command signal is applied to conductor 18 and consequently gate 16 operates. The operation of gate 16 inhibits gate 15 from operating and enables gate 23. The data word read out of the memory is not transmitted through gate 15 to the column conductors to be rewritten in memory 5. Instead a new 22-bit data word applied by control and data processing equipment 27 to cable 37, passes through gate 23 to the column conductors to be written in the memory between times $t_4$ and $t_5$.

The value of the key data bit associated with the new word being written in the memory is also controlled at this time. The input of gate 41 which is connected to the output of gate 21 is not energized since gate 21 is not operated. If the key data bit associated with the new word is to be a 1, a positive key data bit signal is applied to conductor 31 between times $t_4$ and $t_5$ to control the writing of a 1 in the key data bit core in the selected row. If the key data bit is to be a 0 conductor 31 is not pulsed and the key data bit core in the selected row remains in the 0 state.

Key data word erroneously over-written

When the address transmitted to translator 7 identifies a row which contains a data word having a key data bit of value 1 detector 19 and pulser 17 operate. Gate 21 is normally enabled and remains so during this write operation; if a key data word is being erroneously over-written conductor 33 cannot possibly be pulsed with a key data write control signal, since this signal appears only when a key data word is to be correctly over-written.

Gate 21 operates and inhibits gate 16 from operating. Consequently, gate 15 rather than gate 23 is enabled. The new data word is not written in the memory. Instead the key data word read out of the memory, after passing through pulse shaper 11, passes through gate 15 between times $t_4$ and $t_5$. The 22-bit data word previously read out is thus transmitted back to the column conductors. It is this word which is now written back into the memory when pulser 25 causes a current of one-half unit magnitude to flow through the selected row conductor in the left direction.

While the 22-bit key data word is thus rewritten in the memory the key data bit itself is now a 0 since it was switched during the read-out. It is necessary to rewrite a 1 in the key data bit core. The positive pulse between times $t_4$ and $t_5$ at the output of gate 21 is applied to one of the inputs of OR gate 41. This pulse appears in the rightmost column conductor in the memory when the row pulse is applied between times $t_4$ and $t_5$. A 1 is thus rewritten in the key data bit core at the same time that the key data word itself is rewritten in the memory.

Control and data processing equipment 27 must be notified that an attempt has been made to erroneously over-write a key data word. Between times $t_4$ and $t_5$ gate 42 is enabled by the write command signal. The pulse at the output of gate 21 passes through gate 42 and an alarm signal is transmitted to control and data processing equipment 27.

Key data word correctly over-written

It is apparent from the above discussion that in the absence of additional circuitry a key data word could not be over-written and would instead always be rewritten into the memory because the key data bit associated with the key data word is always a 1. In order to over-write a key data word, a key data write control signal is applied by control and data processing equipment 27 to conductor 33 between times $t_5$ and $t_6$. *This key data write control signal indicates that the instruction applied, namely the address of the key data word and that a write operation is to be performed, is privileged to act upon the memory in this way even in the presence of the key data bit being 1.* This pulse inhibits gate 21 from operating. Consequently, even if pulser 17 operates its output pulse, which is overlapped in time by the key data write control signal, is not transmitted through gate 21 to gates 16, 41 and 42. As a result gate 16 is enabled and the write command pulse on conductor 18 passes through this gate to the control terminals of gates 15 and 23. Gate 15 is inhibited from operating and the key data word read out of the memory is not transmitted through gate 15 to be rewritten in the memory. The new data word on conductor 37 passes through enabled gate 23 and is written in the memory between times $t_4$ and $t_5$.

The key data bit was previously a 1. Between times $t_1$ and $t_2$ the key data bit core is placed in the 0 state. The core remains in this state unless a column pulse of one-half unit magnitude is applied to the rightmost column conductor between times $t_4$ and $t_5$. If it is required to store a 1 in the key data bit core, a positive key data bit signal pulse of one-half unit magnitude is applied to conductor 31. This key data bit signal transmitted through OR gate 41, together with the row current, sets the key data bit core of the selected row in the 1 state between times $t_4$ and $t_5$. If the new work being written in the memory is not a key data word the key data bit signal is not applied by control and data processing equipment 27 to conductor 31. Because gate 21 is inhibited from operating by the key data write control signal the other input of OR gate 41 is not enabled. Consequently, the key data bit core is set in the 0 state between times $t_1$ and remains in this state when the entire sequence has terminated. The new word stored in the memory may thereafter be over-written even if a key data write control signal is not applied to conductor 33.

In the illustrative embodiment of the invention the emory is of the destructive type, i.e., once a word is ad out of the memory it is permanently erased unless is rewritten. The invention is equally applicable to ondestructive read-out systems. In such a system when a ey data word location is erroneously addressed during a rite operation it is not necessary to direct the key data ord read out back to the column conductors because e word remains in the memory. It is only necessary to revent the new data word from the control and data rocessing equipment from being written in the memory. hus, if memory 5 is of the nondestructive type while gate 3 is required it is not necessary to include gate 15 in e system. Of couse, other types of writing circuits ould have to be used for controlling the writing of a 0 a memory element containing a 1. Other variations are so possible. For example, it may be desired to inhibit e over-writing of even ordinary data words by key data ords without the transmission of special control signals. he modification required in the circuit of FIG. 1 to rovide this operation will be apparent to those skilled in e art.

The operation of the system of FIG. 1 may be sumarized by considering the table of FIG. 2. On the left de of the table are shown all possible combinations of e various control signals, a 1 representing the presence f a signal and a 0 representing its absence. The seven ghtmost columns represent the operations of various ements in the system for the various combinations of ontrol signals. A √ represents the operation of one of the ates or detector 19 and an X represents the opposite conition. Various ones of the boxes in the rightmost columns ontain two entries. Detector 19 operates during read and l types of write operations if the key data bit readout of e memory is a 1. It does not operate if this key data bit adout of the memory is a 1. It does not operate if this ey data bit is a 0. Consequently for every combination possible control signals two conditions must be condered. Depending on the operation of detector 19 varius ones of the other gates may or may not operate. When e operation of a gate depends on the operation of dector 19 two entries are shown in the table, one above e slashed line and one below it. The entry above the ashed line represents the condition of the gate if detecr 19 operates and the entry below the slashed line repesnts the gate condition if detector 19 does not operate.

To control a read operation the read command signal a 1. The write command signal, the key data write conol signal and the key data bit signal are always 0's when e only operation being performed is the read-out of a emory word. Gate 13 operates because it is enabled by e read command. This gate controls the transmission of e word read out of the memory to the control and data rocessing equipment.

Since the key data write control signal is a 0, gate 21 enabled and operates if detector 19 is operated. Even gate 21 does not operate, however, and gate 16 remains abled, gate 16 does not operate because the write comand signal is a 0. Consequently, gate 15 is enabled as sual and gate 23 is not. The 22-bit data word is transitted through gate 15 to be written back in the memory. the key data bit was originally a 0 it remains a 0. If it as originally a 1 gate 21 has operated and in turn transits a pulse through OR gate 41. This pulse controls the writing of a 1 in the key data bit core. The operation gate 41 is thus dependent on the operation of detector 9, gate 41 operating only if the key data bit was original- a 1 which value must be rewritten in the respective ore.

During a write operation the read command signal is 0 and the write command signal is a 1, as seen in the last ur rows of the table. Four possibilities must be condered to take into account the four possible combinaons of key data write control and key data bit signals.

Consider first the situation in which both of these signals are 0's. This situation exists when an ordinary data word is to be over-written and the new key data bit is also to be a 0, i.e., one ordinary data word is to be written over another. This situation also exists if an attempt is made to erroneously write over a key data word. Gate 13 does not operate since the read command signal is a 0. If the key data bit read out of the memory is a 0 as it should be if the system is operating properly, detector 19 does not operate nor does gate 21. Consequently, gate 16 operates and enables gate 23 while inhibiting gate 15. Since gate 23 is enabled the new 22-bit data word passes through it to be written in the memory. Since gate 21 has not operated, one input of OR gate 41 is not energized. Since the key data bit signal is a 0 the other input of the OR gate is also not energized and the key data bit associated with the new word in the memory remains a 0 as required.

However, if the system is operating improperly and a key data word has been read out of the memory, detector 19 operates. Gate 21 is enabled since the read command signal is 0, and since detector 19 operates so does gate 21. In this situation gate 16 is inhibited from transmitting the write command signal through it. Consequently, gate 15 remains enabled and gate 23 is inhibited from operating. The data word read out of the memory is directed back to it through gate 15 with the new data word being blocked by gate 23. Since the key data bit read out of the memory was a 1 it must be rewritten. Gate 21 is operated and energizes one of the inputs of OR gate 41 even though the other input, the key data bit signal is a 0. Gate 41 operates and controls the rewriting of a 1 in the key data bit core.

Similar remarks apply to the next case where the key data bit signal is a 1. The operation, if a key data word is erroneously read out of the memory, is identical. The only difference is when an ordinary data word is being written over. Since the key data bit signal is a 1, indicating that the new word is key data, OR gate 41 operates and controls the writing of a 1 in the key data bit core. Consequently, after the write operation the key data bit core remains a 1 whether or not it has been attempted to write the new key data word erroneously over an old key data word or correctly over an ordinary data word.

The fourth row in the table represents the case where an ordinary data word is to be written over a key data word. The key data write control signal is a 1 to notify the system that the key data word location has been properly addressed. The key data bit signal is a 0 to control the storage of a 0 in the key data bit core associated with the new word to be written in the memory. Since the key data write control signal is a 1, gate 21 is inhibited from operating whether or not detector 19 indicates a 1 in the key data bit position read out of the memory. Gate 16 is enabled as usual, and the write command signal is transmitted through it to enable gate 23 and to inhibit gate 15. The new data word passes through gate 23 to be written in the memory.

The key data bit core associated with the new word is switched to the 0 state when the old key data word is first read out of the memory. Since the new word is ordinary data, the key data bit must remain a 0. Gate 21 is not operated and thus one input of OR gate 41 is not energized. Since the key data bit signal is a 0 the other input of OR gate 41 is not energized and the rightmost column conductor in the memory is not pulsed. The key data bit core remains in the 0 state.

The last row in the table represents the last situation in which the new word to be written over the old key data word is also key data. The operation of the system is identical to the operation just considered with one difference. The second input of OR gate 41 is now energized by the key data bit signal and a 1 is rewritten in the key data bit core.

Although one specific embodiment of the invention has been particularly described, it is to be understood that the above-described arrangement is merely illustrative of the principles of the invention. Numerous modifications may be made therein and other arrangements may be devised without departing from the spirit and scope of the invention.

What is claimed is:

1. A memory system for a data processor comprising a matrix of magnetic cores arranged in rows and columns, a plurality of row conductors each coupled to all of the cores in a respective row of said matrix, a plurality of column conductors each coupled to all of the cores in a respective column of said matrix, all of the cores but one in each of said rows representing a data word, said one core in each of said rows representing a key data bit with all of said one cores being contained in the same column, pulsing means for applying to a selected one of said row conductors a first pulse for setting all of the cores in the respective row in a first magnetization state and for thereafter applying a second pulse tending but insufficient to set all of the cores in said respective row in a second magnetization state, each of said column conductors having a signal induced therein responsive to the magnetization state of the respective core in the selected row being switched from said second state to said first state by the application of said first pulse to said selected row conductor, means connected to the column conductor which is coupled to all of said one cores in said matrix representing key data bits for detecting a signal induced in said connected column conductor responsive to the application of said first pulse to said selected row conductor, means for reshaping and delaying the signals induced in all of said column conductors except said connected column conductor, and means for applying the reshaped and delayed signals to respective ones of all of said column conductors except said connected conductor simultaneously with the application of said second pulse to said selected row conductor responsive to the operation of said detecting means.

2. A memory system in accordance with claim 1 further including means for applying signals representative of the bit values in a new data word to be written in said memory to respective ones of all of said column conductors except said connected conductor simultaneously with the application of said second pulse to said selected row conductor, and means for inhibiting the application of said new data word signals to said column conductors whenever said reshaped and delayed signals are applied to said column conductors.

3. A memory system in accordance with claim 2 further including means for applying a signal to said connected conductor tending to set said one cores in said second state simultaneously with the application of said second pulse to said selected row conductor responsive to the operation of said detecting means.

4. A memory system in accordance with claim 2 further including means for selectively preventing the application of said reshaped and delayed signals to said column conductors even when said detecting means is operative.

5. A memory system in accordance with claim 2 further including means for selectively applying a signal to said connected conductor simultaneously with the application of said second pulse to said selected row conductor for controlling the magnetization state of the core coupled to said connected conductor and said selected row conductor.

6. A memory system for a data processor comprising a matrix of memory elements arranged in rows and columns, a plurality of row conductors each coupled to all of the elements in a respective row of said matrix, a plurality of column conductors each coupled to all of the elements in a respective column of said matrix, all of the elements but one in each of said rows representing a data word, said one element in each of said rows representing a key data bit with all of said one elements being contained in the same column, pulsing means for applying to a selected one of said row conductors a first pulse for setting all of the elements in the respective row in a first state and for thereafter applying a second pulse tending but insufficient to set all of the elements in said respective row in a second state, each of said column conductors having a signal induced therein responsive to the state of the respective element in the selected row being switched from said second state to said first state by the application of said first pulse to said selected row conductor, means connected to the column conductor which is coupled to all of said one elements in said matrix representing key data bits for detecting a signal induced to said connected column conductor responsive to the application of said first pulse to said selected row conductor, means for applying signals representative of the bit values in a new data word to be written in said memory to respective ones of all of said column conductors except said connected conductor simultaneously with the application of said second pulse to said selected row conductor, and means for inhibiting the operation of said signal applying means responsive to the operation of said detecting means.

7. A memory system in accordance with claim 6 further including means for selectively preventing the operation of said inhibiting means even when said detecting means is operative.

8. A memory system in accordance with claim 6 further including means for selectively applying a signal to said connected conductor simultaneously with the application of said second pulse to said selected row conductor for controlling the state of the one element coupled to said connected conductor and said selected row conductor.

9. A memory system for a data processor comprising a matrix of magnetic cores arranged in rows and columns, a plurality of row conductors each coupled to all of the cores in a respective row of said matrix, a plurality of column conductors each coupled to all of the cores in a respective column of said matrix, all of the cores but one in each of said rows representing a data word, said one core in each of said rows representing a key data bit with all of said one cores being contained in the same column, pulsing means for applying to a selected one of said row conductors a first pulse for setting all of the cores in the respective row in a first magnetization state and for thereafter applying a second pulse tending but insufficient to set all of the cores in said respective row in a second magnetization state, each of said column conductors have a signal induced therein responsive to the magnetization state of the respective core in the selected row being switched from said second state to said first state by the application of said first pulse to said selected row conductor, means connected to the column conductor which is coupled to all of said one cores in said matrix representing key data bits for detecing a signal induced in said connected column conductor responsive to the application of said first pulse to said selected row conductor, means for selectively applying signals to respective ones of all of said column conductors except the column conductor which is coupled to all of said one cores in said matrix representing key data bits simultaneously with the application of said second pulse to said selected row conductor for setting the respective cores in said selected row in said second magnetization state, and means for controlling the operation of said signal applying means in accordance with the operation of said detecting means.

10. A memory system in accordance with claim 9 further including means for applying a signal to said column conductor which is coupled to all of said one cores representing key data bits simultaneously with the application of said second pulse for setting the key data bit core in said selected row in said second magnetization state responsive to the operation of said detecting neans, and means for selectively controlling the setting f said key data bit core in said selected row in either f said magnetization states independent of the operaion of said detecting means.

11. A memory system for a data processor comprising matrix of memory elements arranged in rows and colmns, each of said memory elements having first and econd states, all of the elements but one in each of said ows representing a data word, said one element in each f said rows representing a key data bit with all of said ne elements being contained in the same column, means electively connectable to all of the elements in each of aid rows for setting all of the elements in a selected ow in said first state and for thereafter enabling all of aid elements in said selected row to be set in said secnd state, a plurality of column conductors connected to espective columns of said elements each having a signal nduced therein responsive to the state of the respective lement in the selected row being switched from said econd state to said first state, means connected to the olumn conductor which is coupled to all of said one lements in said matrix representing key data bits for etecting a signal induced in said connected column conuctor, a plurality of means for selectively applying sigals to all of the elements in respective ones of said colmns except said column containing said key data bit lements for setting the elements in said selected row in aid second state when said elements are enabled, and neans for controlling the operation of said plurality of ignal applying means in accordance with the operation f said detecting means.

12. A memory system in accordance with claim 11 urther including means for setting the key data bit elenent in said selected row in said second state when said lement is enabled responsive to the operation of said letecting means, and means for selectively controlling the etting of said key data bit element in said selected row n either of said first and second states independent of he operation of said detecting means.

13. A data processor comprising a source of address ignals, a source of control signals, a memory having a lurality of locations, each of said locations including data word and a respective key data bit, means responive to said source of address signals for reading a data word and the respective key data bit from said memory, neans responsive to said key data bit read having a irst binary value for rewriting said data word read back n said memory, and means responsive to a control signal from said source of control signals for inhibiting he rewritting of said data word read back in said memory ven when the respective key data bit read has said first inary value.

14. A data processor comprising a source of address signals, a source of control signals, a memory having a plurality of locations, each of said locations including a data word and a respective key data bit, means responsive to said source of address signals for reading a data word and the respective key data bit from said memory, means responsive to the key data bit read having a first binary value for writing a new data word in said memory, means responsive to said key data bit read having a second binary value for inhibiting the operation of said writing means, and means responsive to a control signal from said source of control signals for controlling the writing of said new data word in said memory even when the respective key data bit read has said second binary value.

*15. A memory protection system comprisings*

*first means for indicating whether an instruction which results in said memory being acted upon in a predetermined manner is privileged;*

*second means for indicating whether the portion of said memory acted upon in said predetermined manner is conditionally protected;*

*and means responsive to the combined occurrence of an indication from said first indicating means that said instruction is not privileged and to an indication from said second indicating means that said area of memory is conditionally protected for generating an interrupt.*

*16. A memory protection system comprising*

*first means for indicating whether a command which results in said memory being acted upon in a predetermined manner is privileged;*

*second means for indicating whether the portion of said memory acted upon in said predetermined manner is conditionally protected;*

*and means responsive to the combined occurrence of an indication from said first indicating means that said command is not privileged and to an indication from said second indicating means that said portion of memory is conditionally protected for generating a signal.*

References Cited

The following references, cited by the Examiner, are of record in the patented file of this patent or the original patent.

UNITED STATES PATENTS

| | | | |
|---|---|---|---|
| 2,856,596 | 10/1958 | Miller | 340—174 |
| 2,997,696 | 8/1961 | Buchholz et al. | 340—174 |
| 3,108,257 | 10/1963 | Buchholz | 340—172.5 |
| 3,264,615 | 8/1966 | Case etal. | 340—172.5 |
| 3,328,765 | 6/1967 | Amdahl et al. | 340—172.5 |
| 3,328,768 | 6/1967 | Amdahl et al. | 340—172.5 |

RAULFE B. ZACHE, Primary Examiner